United States Patent [19]
Ward

[11] 3,722,812
[45] Mar. 27, 1973

[54] TEMPERATURE CONTROL DEVICE

[75] Inventor: H. Kenneth Ward, Arcadia, Calif.

[73] Assignee: Ward & Son, Inc., City of Industry, Calif.

[22] Filed: Oct. 12, 1970

[21] Appl. No.: 79,768

[52] U.S. Cl. ..................236/15 A, 74/522, 219/279
[51] Int. Cl. ................................................F23n 5/06
[58] Field of Search...236/15 A, 78 A; 219/279, 476; 74/56, 522

[56] References Cited

UNITED STATES PATENTS

| | | | |
|---|---|---|---|
| 2,537,695 | 1/1951 | Page | 219/279 X |
| 2,463,712 | 3/1949 | Newell | 236/15 |
| 2,810,435 | 10/1957 | Demi et al. | 74/56 X |
| 2,389,014 | 11/1945 | Weber | 219/279 X |
| 3,391,867 | 7/1968 | Zulian | 236/15 |
| 3,462,079 | 8/1969 | Demi | 74/522 |

Primary Examiner—William E. Wayner
Attorney—Jones and Lockwood

[57] ABSTRACT

A temperature control device for regulating two primary energy sources simultaneously is disclosed. A single rotatable shaft provides the primary adjustment of a valve for regulating gas flow and the primary adjustment of the main contacts for an electric supply regulator, whereby the two regulators may be adjusted to a desired temperature setting. Secondary adjustment and operation of the device is by means of a temperature sensitive capillary tube which operates in response to a parameter to be controlled to expand or contract a bellows. The movable diaphragm of the bellows is connected by way of a second shaft to position both the gas valve and the electric contacts in accordance with the measured value.

15 Claims, 4 Drawing Figures

Patented March 27, 1973    3,722,812
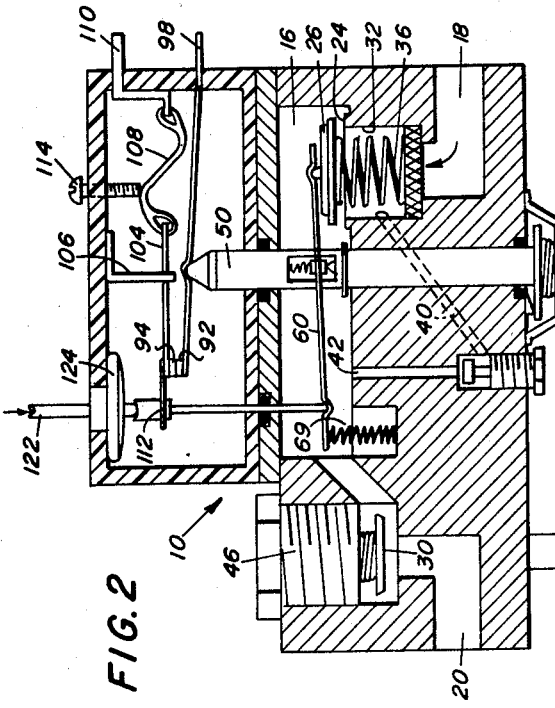
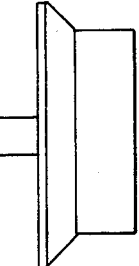
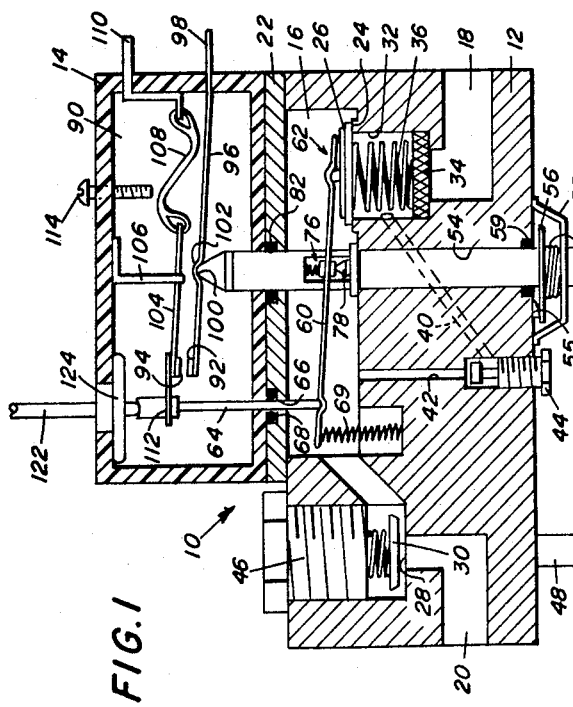
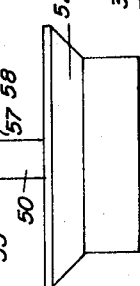
INVENTOR
H. KENNETH WARD
BY Jones and Lockwood
ATTORNEYS

TEMPERATURE CONTROL DEVICE

FIELD OF THE INVENTION

The present invention relates, in general, to thermostatic control devices and, more particularly, to a device for regulating the flow of a gaseous fuel through its supply line and, at the same time, regulating an electric power supply, the control being in a single housing and set by a single control shaft.

DESCRIPTION OF THE PRIOR ART

Automatic controllers, such as thermostats responsive to ambient temperature, to a temperature measured at a particular location, or to other parameters, are well known in the prior art, it being usual to utilize such controllers to regulate, for example, the flow of fuel in response to variations in a measured parameter such as temperature. Such devices have in the past utilized bimetallic elements and other temperature sensitive devices to regulate electrical controls which have, in turn, regulated various types of heat sources. Other control devices respond to measured temperature values to operate valves to control gas or oil flow, regulate control contacts for electric heaters and the like, and serve to operate virtually every type of fuel supply system.

It has, however, been found desirable to provide a single thermostatic control which is capable of simultaneously regulating in a predetermined relationship two distinct and separate energy sources which would normally be considered incompatible; namely, to control a gas supply line and, at the same time, an electric supply. Such a dual control may be desirable for example, where two different systems are to be regulated by a single temperature control, as where one system acts as a back-up for the other system, where it may be desired to provide alternative methods of supplying heat, or where an auxiliary system is required to provide assistance during periods of peak load. Although the advantages and disadvantages of using gas or electricity as the energy source in various circumstances are well known, it may be desirable to provide both sources where the characteristics of both are required to supplement each other. Factors such as relative cost, availability, speed of response, and temperature ranges may be involved, among others.

The prior art has not recognized the advantages of regulating two different, independent sources of fuel energy from a single thermostat, although numerous patents disclose the use of, for example, electric contacts to control the regulation of a gas supply valve. Such contacts are generally found in the control system for the valve operating mechanism, and thus serve to regulate gas flow rather than to regulate the supply of electrical energy to a load. Control systems of this type may be said to require the use of an external supply of electrical energy to control the operation of the gas supply valve and thus may be distinguished from the present invention, which does not require the use of such an external control source.

The prior art also suggests the use of electrical contacts in combination with fluid supply valves for use in providing an indication of valve condition, or position, i.e., whether it is open or closed. Such indicator circuits again may be distinguished from the present invention, for the electrical contacts disclosed do not necessarily respond to or reflect the condition of the parameter being measured.

SUMMARY OF THE INVENTION

Accordingly, it is an object of the present invention to provide a control device capable of regulating two distinct primary energy sources.

A further object of the invention is to provide a control device which is capable of regulating the flow of a gas fuel and simultaneously regulating a primary source of electrical power, both sources being regulated by a common manually operable control device.

It is a further object of the present invention to provide a thermostatic control for regulating one or the other of a pair of diverse energy sources, the device being adjustable by means of a single control mechanism and being responsive to a single detector which is in turn responsive to the parameter being controlled.

A further object of the invention is to provide a thermostatic control element including means for regulating the flow of a gaseous fuel, means for regulating the flow of electrical energy, control means for setting the initial conditions of the two regulators, and common detector means responsive to the parameter being controlled for operating the two regulators.

Briefly, the temperature control device of the present invention consists of a housing having two cavities, one adapted to serve as a gaseous fuel supply line and to receive a gas control valve, and the other cavity being adapted to receive regulator contacts for an electric power supply system. The gas flow regulator comprises a valve carried by a pivotally mounted lever arm, the midpoint of which is attached to and movable by the main control shaft which is rotatable to set the initial conditions for the thermostat. The main control shaft is suitably mounted in the housing so that it will move axially in and out of the housing as it is rotated in one direction or the other, thereby moving the lever arm and tending to open or close the gas line valve. The electrical regulator contacts include a main contact and a secondary contact, the main electrical contact in the electrical regulator cavity being movably mounted on a suitable lever arm. The main control shaft also contacts this lever arm, whereby rotation of the control shaft also adjusts the position thereof.

The detector for measuring the parameter which is to be controlled may include a capillary tube leading from the location of the detector to a bellows preferably mounted within one or the other of the housing cavities. The capillary tube carries mercury or some other material which expands and contracts in accordance with temperature, whereby the bellows will move in response to a detected temperature condition. Connected to the movable portion of the bellows is a regulator shaft which is connected to the secondary contact for the electrical regulator and also to the lever arm on which the flow valve is mounted. Motion of the bellows will therefore move the secondary electrical contact toward or away from the first contact and may at the same time deform the lever arm carrying the gas supply valve so as to open or close it. Although both regulators operate simultaneously in response to motion of the bellows, the relationship between the closure of the electrical contacts to provide electric energy to a load and the opening of the gas flow valve to provide gaseous fuel to a burner will depend upon the particular connection between the regulator shaft and the electrical contact and the valve lever arm, for lost motion in these connections could provide a delayed operation of one or the other of the regulators. Further, adjustment in the operation of these two regulators is provided by means of a calibration screw for the electrical contacts and by means of a separate calibration screw for the gas valve lever arm. By proper arrangement of the regulator shaft connections and by adjustment of the calibration screws, any desired relationship between the operation of the two regulators may be obtained, whereby one or the other serves as an auxiliary source of fuel or where they may both be used to provide fuel at the same time. Since to prevent arcing at electrical regulator contacts it is necessary to provide a snap action arrangement, as provided herein, it may be desired to use electric heat for a "coarse" adjustment, where the electric heater is either on or off, and to use the gas heat for a "fine" adjustment, for the gas control valve may be slowly varied to provide a desired heating level.

BRIEF DESCRIPTION OF THE DRAWING

The novel features which are characteristic of the present invention are set forth with particularity in the appended claims, but the invention will be understood more clearly and fully from the following detailed description of a preferred embodiment thereof, as set forth in connection with the accompanying drawings, in which:

FIG. 1 is a cross sectional view of a temperature control device made in accordance with the present invention, as viewed from the top and showing the electrical and gas regulators in the off position;

FIG. 2 is a view of the device of FIG. 1, showing the electrical and gas regulators in the on position; and FIGS. 3, 4 and 5 provide an enlarged view of a portion of the control shaft of the device of FIG. 1, FIG. 3 being a partial sectional view of the control shaft taken along line 3—3 of FIG. 4, FIG. 4 being a partial sectional view along line 4—4 of FIG. 3, and FIG. 5 being a top view, taken on line 5—5 of FIG. 4.

DESCRIPTION OF A PREFERRED EMBODIMENT

Referring now to FIGS. 1 and 2 of the drawings, wherein common elements are similarly numbered, the numeral 10 indicates the temperature control device of the present invention, the device including a housing which may be made up of two parts secured together whereby two normally incompatible primary sources of energy may be regulated simultaneously and continuously by a single control unit. The device includes a front housing 12 which includes a cavity forming a gas supply line and which is adapted to receive a gas regulator mechanism, the housing being made of any suitable material such as, for example, cast aluminum. A rear housing 14 is secured to a rear wall of the front housing 12, and includes a cavity adapted to receive an electrical regulator, this rear housing being formed from a suitable material such as a phenolic resin.

The front housing 12 includes a front cavity 16 which constitutes a fluid passageway through the housing. The cavity includes a fluid inlet 18 and a fluid outlet 20 which are adapted for connection in, for example, a conventional gas supply line leading to a burner or the like. The back of cavity 16 is closed by a plate 22 to which the rear housing 14 may be fastened. The fluid passageway formed by cavity 16 carries at least one, and preferably two, valves for controlling the flow of gaseous fluids therethrough. The first valve is formed by a seat 24 formed in the cavity and a main valve cover 26 which the seat is adapted to receive. This first valve comprises the gas flow regulator. The second valve is formed by a seat 28 formed in the gas passageway downstream from the main valve, the seat being adapted to receive a safety valve cover 30 which is adapted to close when the flame of the gas burner is extinguished.

The valve seat 24 is formed by the periphery of an enlarged valve-receiving portion 32 of the fluid flow passage, this enlarged portion being adapted to receive a suitable gas filter 34 which serves to remove any impurities from the gas which might tend to block or clog the valve. The valve head, or cover, 26 preferably is biased toward an open position by means of a suitable coil spring 36 extending between the valve head and the filter and within the valve-receiving portion 32. The bias spring may also operate to center the main valve 26 on the valve seat 24 to assure accurate and reliable operation of the main valve regulator.

Leading from the side wall of enlarged portion 32 is a bypass line or passageway 40 leading to a bypass port 42. A bypass adjustment screw 44 is adjustably positioned in the bypass port, the port leading back to passageway 16. This bypass line permits a predetermined amount of gas, as established by adjustment screw 44, to flow through housing 12 even when the main gas regulator valve 26 is closed. The bypass flow serves to maintain a "pilot" flame at the burner for igniting the gas supplied thereto by the opening of valve 26, the pilot flame producing sufficient heat to activate the safety valve 30. This safety valve may include, for example, an electromagnetic operator, or solenoid, 46 energized, for example, by a thermoelectric generator positioned at the pilot flame. As long as the flame is present, the solenoid 46 remains energized and holds safety valve 30 open, the bypass screw 44 normally being so adjusted as to produce sufficient heat for this purpose. If desired, a manual reset button 48 may be provided for the safety valve to permit manual opening of the valve to allow the pilot to be lit, and to hold the valve open until the safety device is energized by heat from the operating pilot.

Extending through the front housing 12 from front to back is the main control shaft 50 for the subject temperature control unit. This control shaft carries an indicator dial 52 for manual adjustment of the initial operating point for the control unit. If desired, the indicator dial may carry suitable indicia calibrated to permit selection of a desired initial operating point. Shaft 50 extends into the front housing 12 through a bore 54, extends through the passageway 16, through the closure plate 22 and thence into the rear housing 14. A cam and follower arrangement is located at the point where shaft 50 enters housing 14 to produce longitudinal motion in the shaft as it is rotated. A sloping cam surface 55 is secured to the housing, while a follower arm 56 is affixed to and rotatable with the shaft. A bias spring 57 surrounds shaft 50 and bears against the follower to urge the follower against the cam and toward the housing. The outer end of this bias spring bears against a cam assembly cover 58 which is secured to the housing 12. An O-ring 59 may be provided in housing 12 to seal off the passageway through which shaft 50 extends.

A valve lever arm 60 is fastened to or carried by the shaft 50 in a manner to be described, whereby the longitudinal motion to the shaft within the housing due to rotation of cam follower 56 on the shaft permits adjustment of the location of the pivot point of the lever. One end of lever arm 60 is connected to the center of main valve 26, as at 62, while the other end of the lever arm is connected to or otherwise supported by a regulator shaft 64 which is longitudinally movable in response to the parameter being measured, as will be explained. Regulator shaft 64 extends into cavity 16 through a suitable bore or opening 66 in the closure plate 22, the bore being sealed by an O-ring or other conventional packing at 68 to prevent leakage of gas into the rear housing 14. Lever arm 60 may extend past the regulator shaft 64 and may be biased against the shaft by a suitable spring 68; alternatively, the lever arm may be fastened to shaft 64 for movement therewith, thereby eliminating the need for a bias spring.

Referring now to FIGS. 3–5, it will be seen that the gas valve lever arm 60 is supported at a pivot point on the control shaft 50 in such a manner that the shaft may rotate with respect to the lever arm to produce longitudinal motion of the pivot point without laterally displacing the lever arm. This is accomplished by providing the lever arm with a central aperture 70 through which the shaft 50 passes. In order to position the lever arm with respect to the shaft, a pair of support bars 72, 74 extend through an opening 76 in the shaft and clamp the lever arm. As shown, bar 72 passes through the shaft and rests on the top surface of the lever arm, while bar 74, which is parallel to and spaced from bar 72, passes through opening 76 in the shaft and supports the lever arm. The lower support bar rests on the upper tip of a calibration screw 78 which extends through shaft 50 and is threaded for longitudinal adjustment therein. The screw is tapered at its upper end, with the tip portion thereof being received in a corresponding indentation at the center of lower bar 72, thereby supporting this bar. The lever arm then rests on the bar 72, and bar 74 rests on the lever arm, this assembly being held in place by a suitable biasing means such as coil spring 80 carried in the upper portion of shaft 50, as viewed in FIG. 4. This arrangement of the lever arm 60 and its support bars permits the shaft to rotate within the aperture 70 of the lever, without rotating lever arm 60. Support bars 72 and 74 may rotate with the shaft, sliding on their corresponding upper and lower surfaces of lever arm 60 so as to avoid rotation of the lever.

The cutaway opening 76 in shaft 50 is sufficiently large to permit calibration of the device by adjustment of screw 78 and consequent motion of the support bars 72, 74, which form the pivot point of lever arm 60, axially along shaft 50. The exact axial location of this pivot point will, of course, control the effect of regulator shaft 64 on the operation of valve 26; thus, by adjustment of calibration screw 78 and positioning shaft 50, the operation of the main valve 26 can be accurately controlled. Shaft 50 preferably is tubular, with the interior of the shaft being threaded to receive the calibration screw 78. This screw may extend through the shaft from the cutaway portion 76 to the outer end, where it is accessible by removal of dial knob 52, or, alternatively, where it extends through the knob for easy adjustment. By provision of an appropriate slope on cam 55, the longitudinal motion imparted to lever arm 60 by rotation of the shaft 50 will permit the desired degree of accuracy in the adjustment of the gas (and electrical) regulators.

As illustrated in the drawings, shaft 50 extends through the closure plate 22 of the front housing 12 and through the corresponding wall of housing 14 for operation of the electrical contacts therein. The opening around shaft 54 where it passes through wall 22 is sealed by means of an O-ring or other conventional packing means 82 to prevent leakage of gas into the rear housing. The rear housing 14 defines a rear cavity 90 in which is mounted an electric power source regulator which comprises a main contact 92 and a secondary contact 94 mounted for movement toward and away from each other to close (FIG. 2) and open (FIG. 1) an electric circuit. Main contact 92 is mounted on a spring lever arm 96 which is secured to a wall of housing 14 and which may extend therethrough to form an outlet lead 98. Lever arm 96 is biased against the end of control shaft 50, the shaft being provided with a reduced, electrically insulated, tip 100 adapted to fit into a corresponding depression 102 in the lever arm. The spring leaf structure of the arm 96 urges the arm against the shaft 50, whereby the contact 92 is positioned by the longitudinal motion of shaft 50 as the shaft is rotated. Calibrating screw 78 has no effect on the position of arm 96, although it will be seen that both the main contact 92 and the main gas valve 26 may be adjusted to desired positions by rotation of the single control shaft 50.

Secondary electrical contact 94 is carried by a support arm 104 which is pivotally mounted approximately at its center point to a support bracket 106 carried by housing 14. The free end of the support arm 104 is connected to one end of a curved S-shaped spring element 108, the other end of which is secured to a second electrical lead 110 extending out of housing 14. The end of support arm 104 which carries secondary contact 94 may be urged downwardly by means of a bracket 112 secured to the end of support arm 104 and extending to a lost-motion connection on shaft 64, whereby upward and downward motion of shaft 64, as viewed in FIG. 1, will tend to move contact 94 away from or toward main electrical contact 92. The arrangement of spring 108 is such as to provide an overcenter bias for the support arm 104, whereby the electrical contact is of the snap-action type; that is, to close the contacts, shaft 64 will urge contact 94 toward contact 92 until spring 108 causes the contacts to snap together. Similarly, shaft 64 in moving upwardly will urge contact 94 away from contact 92 until spring 108 causes the two contacts to snap apart. This snap action arrangement prevents arcing between the contacts, and thus extends their life, as well as providing a positive operation of the control. The operation of the contacts may be calibrated by means of a calibrating screw 114 extending to a point adjacent the spring 108, whereby the operation of the snap acting switch can be adjusted as desired.

Mounted in cavity 90 of the rear housing 14 is a diastat 120 which is responsive to the parameter being measured, and which serves to operate both the main gas valve 26 and the electrical contacts 92, 94. The diastat may consist, for example, of a detector bulb (not shown) filled with mercury, expansion and contraction of the mercury providing a measurement of a parameter such as temperature which is to be regulated. The mercury bulb may be connected by way of a capillary tube 122 to a bellows device 124 having a diaphragm which moves in response to the expansion and contraction of the mercury. The regulator shaft 64 is connected to the movable bellows diaphragm by suitable lever arm means or the like whereby expansion of the mercury in response, for example, to an increase in temperature will cause the shaft 64 to move on its axis in an upward direction as viewed in FIG. 1. Similarly, contraction of the mercury column due to a decrease in temperature will cause the regulator shaft 64 to move downwardly along its axis, again as viewed in FIG. 1.

In operation, the thermostat is adjusted to, for example, a desired temperature which is to be maintained by the energy sources controlled by the gas and electric regulators. This is accomplished by rotating the control shaft 50 so that dial 52 indicates the desired temperature level. Assuming that the temperature being measured is at the desired level, the main gas valve 26 will be closed, as shown in FIG. 1, and the electrical contacts 92, 94 will be open, also as shown in FIG. 1. The gas valve may be calibrated by means of calibration screw 78 to assure closure of valve 26, and contacts 92, 94 similarly may be calibrated by the adjustable screw 114. In this condition, a predetermined amount of gas will flow past the closed valve 26 by way of the bypass lines 40, 42, the particular rate of flow depending upon the setting of the bypass screw 44. This bypass flow feeds a predetermined minimum amount of gas to the gas burner, maintaining a pilot flame which provides sufficient heat to hold the safety valve 30 in the open position illustrated. With the temperature at the desired level, regulator shaft 64 will be retracted in the upward direction, as shown in FIG. 1, whereby spring 69 will pivot lever arm 60 about the tip of the calibration screw 78 to hold valve 26 against the valve seat 24. Similarly, the retracted position of shaft 64 permits the spring 108 to shift contact 94 away from contact 92, the latter contact being positioned by shaft 50.

If the temperature being monitored drops below the desired level, the mercury in the detector will cause the bellows diaphragm to move shaft 64 in a downward direction, as indicated in FIG. 2. This motion causes contact 94 to move downwardly into engagement with contact 92, closing the electric circuit between line connections 98 and 110, and thereby permitting energization of, for example, a heating load. At the same time, downward motion of regulator shaft 64 depresses spring 68 and pivots lever arm 60 about the tip of the calibration screw 78, thereby opening the main gas valve 26. This permits a flow of gas from inlet 18 through filter 34 and past valve seat 24 into cavity 16 and thence past the open safety valve 30 to the outlet 20. the further the measured temperature drops below the set level, the further shaft 64 will move to open main valve 26, thereby increasing the flow of gas to the burner and increasing the heating effect thereof. When the temperature rises to the desired level, shaft 64 will return to the position indicated in FIG. 1, opening contacts 92, 94 and closing the gas valve 26.

Thus, there has been described a temperature controlling device which permits simultaneous and continuous control of two separate and distinct energy sources in a single unit by means of a single adjustment mechanism and a single detector. The two energy sources may be a gas supply and an electric power supply, which would normally be considered incompatible in a single control unit because of the danger created by electric contact arcing near a gas flow passage. The present invention avoids this danger by using separate housings for the two regulator devices, but provides means by which both can be set by a common control mechanism, and both can be operated in response to a single detector means. Although the invention has been shown and described in terms of a preferred embodiment and has been explained in terms of a heating load, it will be apparent that the device could be used to control a cooling load or to regulate any desired parameter. Further, it will be apparent that many changes may be made in the details and structural features thereof without departing from the true spirit and scope of the invention, as defined in the following claims.

What is claimed is:

1. A dual regulator controller for regulating two separate energy sources in response to variations in a detected parameter, comprising:

a first regulator comprising a gas control valve;
a second regulator comprising electrical contact means;
a single manually adjustable control shaft connected to both said control valve and said electrical contact means for simultaneously setting said first and second regulators to establish a desired operating condition;
a regulator shaft responsive to said detected parameter;
means connecting said regulator shaft to both said control valve and said electrical contact means for simultaneously and continuously operating said first and second regulators in a direction to adjust said detected parameter toward the established operating condition, said means for connecting said regulator shaft to said control valve including a first lever arm connected at one end to said control valve, at the other end to said regulator shaft, and being pivotally connected to said control shaft, the relative positions of said regulator shaft and said control shaft determining whether said control valve is open or closed, whereby said regulators cooperate to control said energy sources to maintain said parameter at said desired operating condition.

2. The dual regulator of claim 1, wherein the pivotal connection between said lever arm and said control shaft comprises a reduced area portion on said control shaft, a corresponding aperture in said lever arm through which said control shaft passes, and a support arm at said reduced area portion for holding said lever arm.

3. The dual regulator of claim 2, wherein said control shaft carries a calibrating screw for said control valve, said support arm resting on one end of said calibrating screw, a second support arm cooperating with said first-named arm to hold said lever arm and biasing means for holding said support arms in position on said screw.

4. The dual regulator of claim 3, wherein said calibrating screw is coaxial with said control shaft, said control shaft having a cutaway portion adapted to receive said support arm and the tip end of said calibrating screw, whereby said control shaft may be rotated with respect to said lever.

5. A dual regulator controller for regulating two separate energy sources in response to variations in a detected parameter, comprising:
 a first regulator comprising a gas control valve;
 a second regulator comprising electrical contact means having a main lever arm and a secondary lever arm, each said lever arm carrying an electrical contact;
 a single manually adjustable control shaft connected to both said control valve and to the main lever arm of said electrical contact means for simultaneously setting said first and second regulators to establish a desired operating condition;
 a regulator shaft responsive to said detected parameter;
 means connecting said regulator shaft to said control valve and to said secondary lever arm of said electrical contact means for simultaneously and continuously operating said first and second regulators in a direction to adjust said detected parameter toward the established operating condition, the relative positions of said regulator shaft and said control shaft determining whether said electrical contact means is open or closed, whereby said regulators cooperate to control said energy sources to maintain said parameter at said desired operating condition.

6. The dual regulator of claim 5, wherein said secondary lever arm is pivotally mounted and spring biased for snap action, said electrical contact means further including calibration means for said secondary lever arm.

7. The dual regulator of claim 6, wherein said connection between said main lever arm and said control shaft comprises a reduced tip portion on the end of said control shaft and a recess in said main lever adapted to receive said reduced tip portion, said main lever being biased against the end of said control shaft.

8. The dual regulator of claim 5, further including a control valve lever arm connected at one end to said control valve and at the other end to said regulator shaft, and being pivotally connected to said control shaft, whereby the relative positions of said regulator shaft and said control shaft determine whether said control valve is open or closed.

9. The dual regulator of claim 8, wherein the pivotal connection between said control valve lever arm and said control shaft comprises a reduced area portion on said control shaft, a corresponding aperture in said control valve lever arm through which said control shaft passes, and a support arm at said reduced area portion for holding said control valve lever arm.

10. The dual regulator of claim 9, wherein said control shaft carries a calibrating screw for said control valve lever arm, said support arm resting on one end of said calibrating screw, a second support arm cooperating with said first-named support arm to hold said control valve lever arm, and biasing means for holding said support arms in position on said screw.

11. The dual regulator of claim 9, wherein said control shaft is mounted for rotation and consequent longitudinal motion for simultaneously setting the positions of said control valve lever arm and said main lever arm.

12. The dual regulator of claim 11, further including first and second housings for said control valve and said electrical contact means, respectively, said first housing defining a gas line passageway openable and closable by said gas line control valve.

13. The dual regulator of claim 12, wherein said control shaft is mounted in said first housing and extends therethrough into said second housing, and said regulator shaft is mounted in said second housing for longitudinal motion in response to said detected parameter, said regulator shaft extending through said second housing into said first housing.

14. The dual regulator of claim 13, wherein said detected parameter is temperature, said first and second regulators cooperating in response to variations from a set temperature level to open and close said control valve and said electrical contact means in order to regulate said separate energy sources to return said temperature to said set level.

15. The dual regulator of claim 14, further including cam means mounted on said first housing adjacent said control shaft, and cam follower means carried by said control shaft, said cam acting on said cam follower to produce longitudinal motion in said control shaft upon rotation of said shaft.

* * * * *